3,301,327
WELL STIMULATION METHOD
John T. Patton and Francis E. Campion, Tulsa, Okla., assignors, by mesne assignments, to Esso Production Research Company, Houston, Tex., a corporation of Delaware
No Drawing. Filed Aug. 12, 1963, Ser. No. 301,613
4 Claims. (Cl. 166—42)

This invention relates to a process for improving the productivity response of an oilwell subjected to stimulation treatment with a surface-active agent. More particularly, the invention comprises injecting an oil preflush into the well prior to surfactant stimulation whereby a residual oil phase is established in watered out zones, thereby inhibiting water production.

The stimulation of oilwells to restore declining production by injecting solutions of surface-active materials is a well-established technique. For example, see U.S. Patents No. 2,800,962 and No. 2,874,779. Frequently, however, the stimulation of oil flow is accompanied by an undesirable stimulation of water production. Moreover, in some cases the undesirable water production is stimulated to such a great extent that it actually decreases the oil production.

It is an object of the present invention to eliminate or minimize such adverse stimulation of water production, without affecting the desired improvement in oil productivity.

We have discovered that the injection of an oil preflush ahead of the conventional surfactant stimulation treatment accomplishes the stated object. When the well is again placed on production the surfactant solution is produced from all zones, while the preflush is retained in the watered out zones, establishing a high oil saturation and thereby reducing water permeability and water production.

Any water-immiscible, substantially oil-soluble liquid is suitable for injection as the preflush. Crude petroleum oil, or a fraction thereof, is usually preferred for convenience. For example, diesel oil and kerosene are suitable. Other hydrocarbon solvents, such as benzene and other aromatics, may also be employed. Generally the injection of one to fifteen barrels of oil for each foot of formation thickness is a suitable volume. Smaller amounts provide a limited benefit, while larger amounts become uneconomical. One to five barrels of oil per foot of formation thickness is usually preferred. About three barrels per foot of formation is considered optimum in most wells. Obviously, the preflush oil must be substantially free of surface-active material.

A further benefit is obtained by including in the preflush oil an additive capable of lowering its mobility in the presence of water. Aluminum stearate or other aluminum soaps, for example, may be added to the preflush in amounts between 0.1% and 5% by wt., whereby the natural tendency of the oil to resist displacement by water is enhanced.

Following the preflush, a surfactant solution is injected in accordance with known procedures. The surfactant may be either water-soluble or oil-soluble and may be dissolved in an aqueous solvent or a non-aqueous solvent, respectively. For example, the surfactant treatment may comprise the injection of an aqueous solution containing sodium octyl naphthalene sulfonate, an anionic surface-active agent. Oil solutions of oil-soluble surfactants, however, are more commonly employed. For example, the surfactant treatment may comprise the injection of polyoxyethylene sorbitol tetraoleate (containing about 6 mols of ethylene oxide per mol of sorbitol), dissolved in crude petroleum oil.

The concentration of surfactant to be employed is determined in accordance with known procedures. Generally there is a definite upper limit of only a few percent, since it is important to avoid the formation of stable emulsions. The preferred concentrations normally range between .01% and 3.0% by wt., based on active ingredidents, with concentrations between 0.5 and 1.0% being usually employed.

The volume of surface-active solution employed is also based on a consideration of factors previously recognized in the art. For example, the operator should consider not only the thickness of the formation to be treated, but also the probable extent of water blocking in the oil-producing zone, and the porosity thereof. Generally, about 2 to 20 barrels of solution for each foot of formation thickness are employed, and preferably about 3 to 5 barrels.

After the surfactant solution is injected into the formation, it is frequently advantageous to displace the surfactant farther into the formation by the continued injection of surfactant-free oil. This expedient has been used heretofore in connection with conventional treatments, and is also effective to increase the benefits obtained with the present invention.

Before the production of oil from the formation is resumed, it is usually desirable to shut in the well for at least a minute or two for best results. Continued soaking for a week, or even a mouth, is sometimes beneficial. Usually, from ten minutes to twenty-four hours is adequate.

A more complete understanding of the invention may be obtained by a consideration of the following data, which summarize the results of a series of surfactant stimulation treatments of an oilwell producing from Mississippian Limestone having a thickness of 46 feet, a porosity of 12%, and a permeability of 75 to 150 millidarcies.

| Months After First Treatment | Preflush With Oil | Oil Production, b.p.d. | | Water Production, b.p.d. | |
|---|---|---|---|---|---|
| | | Before | After | Before | After |
| 0 | Yes | 55 | 85 | 22 | 0 |
| 14 | No | 70 | 74 | 51 | 70 |
| 26 | No | 45 | 50 | 22 | 68 |
| 39 | Yes | 45 | 71 | 21 | 51 |

Each surfactant treatment of the above series consisted of injecting 120 barrels of a 1% (by volume) solution of surfactant dissolved in lease crude oil. In the first and last treatments, the preflush consisted of injecting 120 barrels of surfacant-free lease crude. As shown by the data, the invention was most effective early in the production history of the well. Nevertheless, a substantial benefit attributable to the preflush was observed in the last treatment.

The oil preflush of the invention is also useful in combination with the conventional surfactant-acidizing treatments which combine the stimulation effects of acid and a surface active substance, or in combination with normal acid jobs when it is desired to minimize water production.

What is claimed is:
1. A method for the treatment of a well that penetrates a formation having an oil-producing zone and a water-producing zone, which comprises first injecting into said formation at least one barrel of surfacant-free oil per foot of formation thickness, then injecting at least one barrel of surfactant solution per foot of formation thickness, and thereafter resuming the production of fluids from said well.

2. A method as defined by claim 1 wherein said surfactant solution is aqueous.

3. A method as defined by claim 1 wherein said surfactant solution is non-aqueous.

4. A method for the treatment of a well that penetrates a formation having an oil-producing zone and a water-producing zone, which comprises first injecting into said formation at least one barrel of surfactant-free oil per foot of formation thickness, said surfactant-free oil containing an additive to lower its mobility in the formation, then injecting at least one barrel of surfacant solution per foot of formation thickness, and thereafter resuming the production of fluids from said well.

References Cited by the Examiner

UNITED STATES PATENTS

| | | | |
|---|---|---|---|
| 2,800,962 | 7/1957 | Garst | 166—42 X |
| 2,927,639 | 3/1960 | Schuessler et al. | 166—42 |
| 3,032,499 | 5/1962 | Brown | 166—42 X |
| 3,131,759 | 5/1964 | Slusser et al. | 166—42 |
| 3,158,199 | 11/1964 | Parkhurst | 166—44 X |

CHARLES E. O'CONNELL, *Primary Examiner.*

JACOB L. NACKENOFF, *Examiner.*

S. J. NOVOSAD, T. A. ZALENSKI,
*Assistant Examiners.*